United States Patent [19]

Nguyen et al.

[11] Patent Number: 5,130,395

[45] Date of Patent: * Jul. 14, 1992

[54] SALT STABLE STARCH GRAFT POLYMERS

[75] Inventors: Charles C. Nguyen; Verne J. Martin; Gary R. Luebke, all of Cedar Rapids; Edward P. Pauley, Jesup; Duane E. Tupper, Cedar Rapids, all of Iowa

[73] Assignee: Penford Products Company, Cedar Rapids, Iowa

[*] Notice: The portion of the term of this patent subsequent to Mar. 26, 2008 has been disclaimed.

[21] Appl. No.: 650,514

[22] Filed: Feb. 5, 1991

Related U.S. Application Data

[63] Continuation-in-part of Ser. No. 472,632, Feb. 5, 1990, Pat. No. 5,003,022, which is a continuation-in-part of Ser. No. 309,248, Feb. 10, 1989, abandoned.

[51] Int. Cl.$^5$ .............. C08G 89/00; B32B 23/08; B32B 27/10
[52] U.S. Cl. .............. 527/300; 527/303; 527/313; 527/314; 527/315; 428/511; 428/512; 428/532; 428/535
[58] Field of Search .............. 527/300, 303, 313, 314, 527/315; 428/511, 512, 532, 535

[56] References Cited

U.S. PATENT DOCUMENTS

| 3,061,471 | 10/1962 | Brockway et al. | 428/395 |
| 3,061,472 | 10/1962 | Brockway | 427/392 |
| 3,095,391 | 6/1963 | Brockway et al. | 527/312 |
| 3,138,564 | 6/1964 | Borunsky | 527/312 |
| 4,301,017 | 11/1981 | Kightlinger et al. | 252/8.6 |
| 4,375,535 | 3/1983 | Kightlinger et al. | 527/313 |
| 4,552,940 | 11/1985 | Van Eenam | 527/312 |
| 5,003,022 | 3/1991 | Nguyen et al. | 527/303 |
| 5,004,767 | 4/1991 | Krause et al. | 524/30 |

FOREIGN PATENT DOCUMENTS 408099 1/1991 European Pat. Off. .

OTHER PUBLICATIONS

Moller et al., Abstract: "Novel Starch Containing Polymer Dispersions as Binders for Paper and Board Coating", (Jun. 1989).

Moller et al., "Novel Starch Containing Polymer Dispersions as Coating Binders", (May 1990).

Primary Examiner—Nathan M. Nutter
Attorney, Agent, or Firm—Marshall, O'Toole, Gerstein, Murray & Bicknell

[57] ABSTRACT

An aqueous, salt stable polymeric dispersion comprising the reaction product of a thinned, gelatinized starch and one or more vinyl monomers, said monomer(s) comprising at least 10% 1,3-butadiene by weight is disclosed.

19 Claims, No Drawings

SALT STABLE STARCH GRAFT POLYMERS

This is a continuation-in-part of application Ser. No. 07/472,632 filed Feb. 5, 1990, and now U.S. Pat. No. 5,003,022 which is a continuation-in-part of application Ser. No. 07/309,248 filed Feb. 10, 1989 and now abandoned.

BACKGROUND OF THE INVENTION

The present invention relates to aqueous polymeric dispersions comprising starch and polymers of vinyl monomers such as styrene and butadiene. Such dispersions are useful as binder materials in paper coating compositions. Blends of starch and synthetic latex materials are useful as binders in paper coatings as they provide a combination of the advantageous qualities of each of the two types of binder materials. Such blends, however, suffer from various limitations, one of which is instability in the presence of a salt solution.

SUMMARY OF THE INVENTION

The present invention relates to the discovery that aqueous polymeric dispersions comprising starch and vinyl monomers can be prepared which are extremely stable in the presence of salt solutions. Specifically, the invention provides an aqueous, salt stable, polymeric dispersion comprising at least 20% by weight of solids, said dispersion comprising the reaction product of a thinned, gelatinized starch and one or more vinyl monomers, said monomer(s) comprising at least 10% 1,3-butadiene by weight with a vinyl monomer to starch ratio of between about 2:10 and about 190:10.

It has been found that the aqueous dispersions of the 1,3-butadiene containing reaction products of co-owned and copending U.S. Ser. No. 07/472,632 filed Feb. 5, 1990, incorporated by reference herein, exhibit improved chemical, physical and mechanical stability when compared to blends of starches and synthetic latexes. Such dispersions which are prepared by reacting starch and vinyl monomers in the presence of peroxide and persulfate initiators show salt stability at vinyl monomer to starch ratios of between about 2:10 and about 190:10.

In accordance with the desired end uses of the product, the stable aqueous dispersion is generally characterized by a solids content of at least 20% by weight. Preferably, the solids content is at least 30% by weight and most preferably above 45% by weight. The dispersion has useful properties at viscosities ranging from the very low to the very high. Nevertheless, while the viscosity of the dispersion is generally at least 50 cps, it is preferably less than 10,000 cps, more preferably less than 2,000 cps and most preferably less than 1,000 cps.

The aqueous, salt stable dispersions of the invention can be used as adhesives and as binding materials in a variety of applications including coating color compositions for the coating of paper and other similar substrates. The salt stable dispersions of the invention can also be blended with other latex and starch dispersions to contribute salt stability to those dispersions and coating compositions. Given the particularly useful characteristics of the dispersions, it is contemplated that those of skill in the art would find numerous other applications for the salt stable dispersions. It is contemplated that the dispersions be particularly useful as textile sizes, adhesives in nonwoven fabrics, modifiers in plastics, as components of water-based inks and wet-end starches in paper manufacturing processes. It is also contemplated that the salt stable dispersions will find utility in film preparation for consumer applications such as the production of "plastic" bags and the like and in industrial and agricultural applications such as the production of agricultural mulch-films.

The dispersions are particularly useful as binding materials in coating compositions for paper and other substrates where they are capable of providing unique properties to the coated end product. Paper coatings comprising the dispersions of the invention as binders exhibit a unique combination of improved properties. When used as binders in paper coating compositions, the salt stable materials of the invention provide positive properties associated with starch binders such as binding strength, color and film clarity, water retention and low cost. As one example, the materials of the invention can typically be produced without surfactant which results in less foaming during coating color preparation and application. Moreover, the increased stability of the dispersions leads to improved runnability on high speed coating machines. Further, the mechanical stability of the dispersions is such that the dispersions can be blended directly with a pigment such as clay during the make-down step. Typically, latex materials are added after make-down of the pigment because the mechanical stresses during make-down will destabilize the latex materials. Additionally, the materials further provide positive properties associated with synthetic latex materials such as high gloss and good ink interaction while avoiding the mottle typically associated with blends of starch and latex materials.

In addition, the high degree of mechanical stability of the dispersions of the present invention is such that they can be mixed under high shear conditions with dry clay. Such high shear mixing of prior art lends of starch and latex results in agglomeration of the latex. Other methods of mixing starch/latex blends with clay involve adding water to suspend the clay. Unfortunately, such added water cannot then readily be removed with the result that the total solids content of such mixtures is thereby limited.

DETAILED DESCRIPTION

The present invention provides methods for the preparation of an improved aqueous dispersion of a reaction product of a thinned, gelatinized starch and one or more vinyl monomers comprising at least 10% 1,3-butadiene by weight. The invention further provides the aqueous polymeric dispersion wherein the vinyl monomers comprise one or more vinyl monomers other than 1,3-butadiene in addition to 1,3-butadiene. According to the invention, a paste of thinned starch is reacted with vinyl monomers including 1,3-butadiene in the presence of a suitable initiator (catalyst) and for a period of time sufficient to provide the salt stable aqueous dispersion of the invention.

SUITABLE STARCH MATERIALS

Starch materials useful according to the present invention include practically all thinned starches of plant origin including starches from corn, wheat, potatoes, tapioca, rice, sago and sorghum, with corn starch being preferred. Waxy and high amylose starches are also thought to be suitable. The starches can be thinned by acid hydrolysis, oxidative hydrolysis or enzymatic degradation. By the term "thinned starch," it is contemplated that thin natural polysaccharide materials such as dextrins, maltodextrins, chemically substituted maltodextrins and enzyme thinned maltodextrins will prove useful with the present invention. Thinned derivatized starches are also suitable for practice of the invention. Suitable starch derivatives include those such as starch ethers, starch esters, cross linked starches, oxidized starches and chlorinated starches.

Preferred materials include hydroxyalkyl starch ethers including hydroxyethyl and hydroxypropyl starch ethers and particularly enzyme thinned hydroxyethyl starch ethers. A particularly preferred starch material is a thin, lightly oxidized hydroxyethyl corn starch ether available commercially as Pencote ® (Penford Products, Inc., Cedar Rapids, Iowa). According to a procedure for manufacturing such a starch, the pH of a slurry of starch is raised to 11.0 and the starch is hydroxyethylated. Hypochlorite is added at a level of 0.6–0.8% (available chlorine based on starch weight). The reactor is then held at 95°–105° F. for two hours and is followed by an acid thinning step. The granular starch is then neutralized, thoroughly washed and filtered. The oxidation serves to lower the protein content of the starch, not only improving the purity, but also bleaching the material white.

An especially preferred starch material is a lightly oxidized hydroxyethyl starch such as Pencote ® which has been gelatinized and enzyme thinned to yield a highly thinned starch with an intrinsic viscosity less than 0.12 dl/g. According to one method, a slurry of lightly oxidized hydroxyethyl starch (Pencote ®) which has an intrinsic viscosity of about 0.23 dl/g is cooked at about 37% solids (dry substance basis) to gelatinize the starch and thinned with 0.01–0.02% alpha-amylase at a temperature of 88° C. for about 90 minutes. Hypochlorite solution is added to the cooked thinned material to deactivate the enzyme. The starch material so thinned is characterized by an intrinsic viscosity of about 0.077 dl/g and may be cooled and used in a reaction to produce a high solids, low viscosity, stable polymeric dispersion. Another preferred material is a hydroxyethylated starch known as Penford Gum 300 (Penford Products, Inc., Cedar Rapids, Iowa). Unlike Pencote ®, it is neither acid hydrolyzed nor lightly oxidized, but it can be enzyme thinned to the same end point as Pencote ®, although the thinning process takes somewhat longer.

Another preferred material is an underivatized enzyme thinned starch which can be produced from an unmodified corn starch slurry having a solids content of between 10 and 45% and preferably between 35 and 45%. The slurry first can be refined (i.e., residual proteins removed and the starch whitened) by adding a sodium hypochlorite solution containing from 0.1 to 1.0% (with 0.6 to 0.8% preferred) available chlorine based on the starch dry substance. This mixture is allowed to react for one hour or more, with a reaction time of 2 hours being preferred. Residual available chlorine can then be removed by addition of a small amount of sodium metabisulfite, and the slurry can be washed and filtered or centrifuged.

The starch can be dried for later use or reslurried and used immediately. In either case, the starch is slurried to a solids content of about 20 to 45%, with a solids content of 30 to 40% being preferred. The enzyme, usually an alpha-amylase, is then added to the starch slurry. The amount of enzyme will depend on the final solids and viscosity desired, with an enzyme level of 0.005 to 0.1% being preferred and a level of 0.03 to 0.05% being especially preferred. This starch/enzyme slurry is then slowly added to heated water at a rate such that the final desired solids and viscosity are obtained. After addition of the starch/enzyme slurry is complete, and the final viscosity has been obtained, the enzyme is deactivated. The mixture continues to cook until the starch is completely hydrated and dispersed. The paste is then cooled and used immediately in a reaction with vinyl monomers. Alternatively, a high temperature alpha-amylase enzyme can be used while jet cooking the slurry.

SUITABLE MONOMERS 1,3-Butadiene alone can be reacted in the presence of thinned starch or it can be reacted with one or more additional vinyl monomers other than 1,3-butadiene. The general methods of the invention are also expected to be useful in reacting other vinyl monomers which are dienes in the presence of starch. Such diene monomers which are, in general, more reactive than 1,3-butadiene include isoprene, chloroprene, cyclobutadiene and divinyl benzene. Suitable vinyl monomers which can be coreacted with 1,3-butadiene include alkyl acrylates, hydroxylated alkyl acrylates, alkyl methacrylates, hydroxylated alkyl methacrylates, alkyl vinyl ketones, substituted acrylamides, methacrylic acid, N-methylol acrylamide, 2-hydroxyethyl acrylate crotonic acid, itaconic acid, fumaric acid, maleic acid, maleic anhydride, vinyl halides, vinylidene halides, vinyl esters, vinyl ethers, vinyl carbazole, N-vinyl pyrrolidone, vinyl pyridene, chlorostyrene, alkyl styrene, ethylene, propylene, isobutylene, vinyl triethoxy silane, vinyl diethylmethyl silane, vinyl methyl dichloro silane, triphenyl vinyl silane, 1-vinyl-1-methylsila-14-crown-5. Preferred vinyl monomers include methyl methacrylate, vinyl acetate, acrylonitrile, acrylic acid, acrylamide, maleic anhydride, monovinyl silicon compounds including vinyl trimethyl silane, with vinylidene chloride, butyl vinyl ether and styrene being particularly preferred, and styrene being most preferred. Particularly preferred is the use of 1,3-butadiene monomer in combination with styrene monomer to form a reaction product with starch. It is to be understood that the vinyl monomers used according to the present invention may comprise 1,3-butadiene in combination with more than one additional vinyl monomer. Particularly preferred vinyl monomers for use in combination with 1,3-butadiene and styrene monomers, for example, are acrylamide, acrylic acid and maleic anhydride.

It is believed that the reactions carried out according to the methods of the invention can result in grafting of vinyl monomers such as styrene and 1,3-butadiene to the molecules of thinned starch. Accordingly, "reaction product" as used herein should be considered as encompassing starch graft copolymers when referring to the products of the peroxide and persulfate initiated reactions described herein.

CHAIN TRANSFER AGENTS

Conventional chain transfer agents, known to the synthetic rubber industry as "modifiers" may be employed to regulate the molecular weight of the polymer formed. Suitable chain transfer agents include materials such as n-dodecyl mercaptan, n-cetyl mercaptan, bromoform, carbon tetrachloride and the like in amounts ranging from 0.01 to about 5 percent of the monomer weight, with 0.10 to about 1% being preferred.

INITIATORS

Initiators (catalysts) suitable with the present invention include those materials which act to initiate free radical polymerization on and in the presence of the derivatized and/or thinned starches to yield the aqueous salt stable dispersions of the present invention. The initiation of polymerization on the derivatized and/or thinned starches will result in grafting to the starch molecule. Suitable initiators include organic and inorganic peroxy compounds, azo compounds and persulfate compounds. Hydrogen peroxide and persulfate ion free radical initiators are preferred, with potassium persulfate being particularly preferred for use according to the methods of the present invention. Persulfates may be used in amounts of at least about 0.01% of the weight of monomers used, but are preferably used in a range of from about 1% to about 10%. Persulfates may be used in solid form. Such use allows production of dispersions with higher solids contents. The persulfate initiator may be used alone or in a mixture with other initiators. In addition, the initiator can be added at once or over the course of the polymerization time.

It is sometimes the case that reducing agents are required to activate the decomposition of the above-identified free-radical initiators. Suitable reducing agents may include ferrous ammonium sulfate, ascorbic acid, sodium bisulfite, sodium metabisulfite and sodium thiosulfate. These reducing agents can be added at once at the beginning or during the course of the reaction.

SURFACTANTS

Surfactants can be used to stabilize the aqueous dispersion and can be added either before reaction or after the reaction is complete. Suitable types of surfactants include anionic, cationic, amphoteric and nonionic surfactants, with anionic surfactants being preferred. Cationic surfactants are generally not used alone but can be combined with other surfactants. Care should be used in selecting the surfactant such that it not interfere with the reaction or with the use of the final dispersion in the process of paper coating such as by flocculation of the clay or providing undesirable viscosity in the dispersion. Anionic surfactants are preferred, with dodecyl benzene sulfonic acid, sodium salt (sodium dodecyl benzene sulfonate) being particularly preferred. Surfactants may generally be used at levels up to about 10% of the monomer weight, with a level of about 1 to 5% being preferred for use of sodium dodecyl benzene sulfonate.

REACTION CONDITIONS

Typically, the polymeric dispersions of this invention consist of vinyl monomers reacted in the presence of a thinned starch and a free radical initiator. The starches used in this invention are gelatinized by cooking at a solids content of between 20 and 40% (dry basis), with a solids content of between 30 and 40% being especially preferred. The cooked, gelatinized, thinned starch paste is then placed in a reaction vessel capable of containing and withstanding the pressure of the reaction. Because of the relatively high volatility of 1,3-butadiene, it is reacted under pressure. In general, the more 1,3-butadiene present in the reaction mixture, the higher the pressure at which the reaction is run. Maximum pressures during the reaction are generally between 25 and 300 psig (or more).

One or more surfactants can be added at any time during the process. Preferred amounts, when added, range to as high as 10% based on the total monomer weight, with amounts ranging from 1 to 5% being especially preferred.

The free radical initiator or initiators can be added at any time during the process. A preferred method of free radical initiator addition would have from 2 to 10% (based on total monomer weight) added to the starch prior to monomer addition, with from 0 to 5% (based on total monomer weight) being added in increments during the reaction.

The total vinyl monomer to starch weight ratio in the aqueous dispersion is between about 2:10 and about 190:10, and a ratio of between about 6:10 and 8:10 being most preferred. 1,3-Butadiene can be reacted with gelatinized starch alone or in the presence of other vinyl monomers. When 1,3-butadiene and styrene are used as the monomers, the amount of 1,3-butadiene ranges from at least 10% and preferably up to about 70% by weight. Most preferably, the 1,3-butadiene is present at weight concentrations of from about 20% to about 40% in combination with styrene in concentrations of from about 60% to about 80%. The monomer or monomers can be added at the beginning or during the course of polymerization, depending on reaction conditions. The monomers are preferably added after the addition of the surfactant and the free radical initiator. Preferably, the less volatile reactants are added first and the more volatile reactants are added last.

The starch/vinyl monomer reaction can be carried out over a wide temperature range depending on the type of monomers and initiators used. Normally the temperatures would range from 25° to 120° C., with a reaction temperature range of 50° to 90° C. being preferred. The reaction mixture is preferably stirred while it undergoes heating.

A reaction time ranging from about 0.5 to 24 hours after addition of the initiator is usually adequate to produce a final starch dispersion with suitable properties. In particular, a reaction time of from about 2 to about 12 hours has been found to be particularly preferred for production of suitable product.

It is desired that the level of residual monomers is minimized in the final reacted product. Accordingly, a post reaction treatment may be necessary. A preferred treatment comprises the incorporation of additional initiator. The use of steam-vacuum distillation has been found to lower residual styrene concentrations while providing a product with lower viscosity and higher solids. Another method comprises carrying out the reaction at 70° C. for three hours and then at 90° C. for two hours with steam vacuum distillation, while still another method comprises use of a jet cooker to efficiently remove residual monomer.

EXAMPLES

In these examples, a mixture of 1,3-butadiene and styrene, and of acrylic acid were reacted with a derivatized, thinned starch at a monomers/starch ratio of 70/30 (23:10) or higher, using potassium persulfate ($K_2S_2O_8$) as an initiator. The resulting aqueous dispersions were used as binders in paper coating on a lightweight base stock.

EXAMPLE 1

In this example, 1,3-butadiene-styrene mixture, and its mixture with acrylic acid, were reacted in the presence of a derivatized, thinned starch at a monomers/starch ratios of 70/30, 75/25 and 80/20. Hydroxyethylated starch (Penford Gum-300, Penford Products Co., Cedar Rapids, Iowa) was first enzyme-thinned and cooked at 39–40% solids in a laboratory cooker at 88° C. for one hour. It was then cooled to room temperature and the viscosity was determined as being 179–184 cps with a Brookfield viscometer, spindle number 3 at 100 rpm. The reaction parameters are set out in Table 1 below.

On a dry substance basis, an amount of derivatized, thinned starch was charged into a 2-liter pressurized reactor (Parr Instrument), followed by water to obtain the calculated final solids of 50%, and potassium persulfate powder (used 5% based on total monomers weight). This mixture was agitated for 10 minutes, and styrene, then 1,3-butadiene monomers were added using a weight ratio of 65/35 for styrene/1,3-butadiene. The content of the reactor was heated to 69° C. in 3 hours and maintained at this temperature for 8 hours. The resulting product was cooled to room temperature. The pH was adjusted to 6.5 with concentrated aqueous ammonium hydroxide and viscosity was measured with a Brookfield viscometer, spindle number 1, at 20 rpm. The resulting dispersions were then rated as excellent, good, or poor based on the degree of product stability. Other techniques were also used to characterize the resulting dispersions and are described below:

GRAFTING EFFICIENCY AND EXTRACTABLE/UNEXTRACTABLE RATIO

The following methods were used to determine grafting efficiency and the ratio of extractable vinyl monomers and polymers thereof to unextractable solids (extractable/unextractable ratio). According to this procedure, ten grams dry weight of the reaction product dispersion were diluted to 30% solids with water. The diluted dispersion was then slowly pipetted into 300 ml of cooled isopropanol (isopropanol was cooled to 5° C. in an ice water bath) while it was being stirred. The product was precipitated as small solid particles. After the addition of the product dispersion to isopropanol was completed, the product and isopropanol mixture was stirred at 5° C. for at least one hour. The mixture was then vacuum filtered through Whatman filter paper No. 1, and transferred to a drying dish and dried overnight in a ventilated hood. The product was then extracted with toluene in a Soxhlet extractor to remove the monomers and ungrafted polymers. The extraction was extended until the weight of the extracted product remained unchanged (normally it took two to three days to complete the extraction). The extracted product was air dried and then oven dried at 115° C. for one day, and its weight was obtained. The oven dried weight of the product after extraction was used in the calculation of grafting efficiency and the ratio of extractable vinyl monomers and polymers thereof/unextractable solids which are defined as follows:

T = dry weight of the product before extraction.
GS = dry weight of the unextractable solids.
OS = dry weight of the starch before reaction.
M = weight of monomers used.
Ad = dry weight of the additives used in the reaction, i.e., initiator, surfactant, etc.

From these values, one can calculate:
Amount of extractable vinyl monomers and polymers thereof, UP: UP = T − GS.
Amount of grafted polymers and unextractable cross-linked polymers, GP: GP = GS − (OS + Ad).

Grafting efficiency (GE) in percent: GE = (GP/M) × 100.
Ratio of extractable vinyl monomers and polymers thereof/unextractable solids = UP/GS.

SALT STABILITY

The purpose of this test is to determine the resistance of a starch dispersion made according to the invention to coagulation in the presence of salt. Specifically, a dispersion was titrated with a saturated calcium chloride aqueous solution. About 2 to 3 grams dry substance of the dispersion was placed into a 100 ml beaker and diluted to 5% solids with distilled water. The calcium chloride solution was then added drop-wise into a diluted dispersion with agitation until coagulation was noticed. All of the starch dispersions showed excellent salt stability, even when a very high amount of salt was added (i.e., 3x the amount of dispersion), and no coagulation was observed.

MECHANICAL STABILITY

The starch dispersion was first thoroughly mixed to insure homogeneity and filtered through a 200 mesh screen. Then a sample of 100 gram dry substance dispersion was placed in a Warring blender and agitated at the highest speed for 30 minutes. The sample was then removed from the blender and filtered through the 200 mesh screen, which was previously wetted with a 4% aqueous surfactant solution. After filtration, the screen was rinsed with distilled water and again with surfactant solution. The screen was then oven dried and residue was weighed. Percent of dry residue based on total amount of dispersion was calculated.

The results of the above tests are listed in Table 2 below for those products which had previously been characterized as having a "good" or "excellent" dispersion.

EXAMPLE 2

According to this example, dispersions comprising the starch/monomer reaction product made in Example 1 were used as a binder for paper coating. The formula of paper coating color is shown below:

| Composition | Dry Parts |
|---|---|
| No. 1 delaminated clay (Nuclay) | 100 |
| Grafted starch dispersion | 18 |
| Total solids | 61–62% |
| pH (with NH$_4$OH) | 8.2–8.5 |

The paper coating colors were prepared by mixing the reaction products with a 70% solids clay slip and then adjusting to a pH of 8.2–8.5 with ammonium hydroxide. These coating colors were coated onto a 28 pound base stock paper at a coating weight of 6.2 to 6.7 pounds per 3,300 square feet per side, and coating both sides sing a blade coater (Browning). The coated papers were dried at 175° F. in an infrared dryer for 7 seconds and then conditioned at 50% relative humidity and 75° F. for 48 hours. The coated paper sheets were supercalendered at 150° F. and 1000 pli for four nips. The gloss and IGT properties were determined. Table 2 shows gloss and IGT data of paper coated with dispersions made in Example 1.

EXAMPLE 3

In this example, buffer was added to the reaction mixture before the reaction was started. Specifically, sodium bicarbonate powder was added at 3% of total monomers weight. The monomers/starch ratios of 75/25 and 80/20 were used. The resulting dispersions were then characterized and coated on a lightweight base stock paper according to the procedures described in Examples 1 and 2. The results are shown in Tables 3 and 4 below and indicate that the dispersion of 3A had excellent salt stability.

EXAMPLE 4

According to this example, a surfactant was used in the reaction. Specifically, an anionic surfactant (using 20% sodium dodecyl benzene sulfonate solution) was added to the reaction mixture at 3% based on total monomers weight. Ratios of monomers/starch were at 70/30 and 80/20. The final products were characterized and evaluated in paper coatings according to Examples 1 and 2. The results of these tests are set out in Tables 5 and 6 below and show that the dispersions of 4A and 4B had excellent salt stability.

EXAMPLE 5

In this example, both buffer and surfactant were incorporated into the reaction mixtures in accordance to Example 1. Monomers to starch ratios of 80/20, 85/15, 90/10, 95/5, and 100/0 were employed. The final solids of the dispersion were targeted to be 47 and 50%. The reaction parameters are shown in Table 7. Only one reaction (5A) produced a product having "good" stability, and it was the product of this reaction which was characterized as having excellent salt stability, with the results listed in Table 8.

EXAMPLE 6

According to this example, reactions in Example 5 were repeated with the amounts of initiator (potassium persulfate), buffer (sodium bicarbonate) and surfactant (sodium dodecyl benzene sulfonate) reduced. Table 9 shows reaction parameters and the resulting dispersions. It is clearly indicated that by changing the amounts of initiator, buffer and surfactant, a stable dispersion at a monomers/starch ratio of up to 95/5 could be obtained (see reaction 6E).

The resulting products were coated on lightweight paper and evaluated according to Examples 1 and 2. Results are shown in Table 10. Excellent salt stability was obtained for all the reacted starch dispersions (6A, 6B, 6E), while a product without starch (Sample 6F) exhibited a poor salt stability.

EXAMPLE 7

In this example, the salt stability of a series of styrene-butadiene latex/starch dispersions was examined, which included:

1. Reacted starch dispersions with monomers/starch ratios of 37/63, 70/30 and 95/5.
2. A styrene-butadiene latex prepared without starch in Example 6 (sample 6F).
3. Blends of styrene-butadiene latex (Sample 6F) with enzyme thinned starch at monomers/starch ratios of 37/63, 70/30 and 95/5.

The procedure for salt stability evaluation as described in Example 1 was used for this series. The results are shown in Table 11. Once again, it is indicated that excellent salt stability was observed for those products using starch in the potassium persulfate initiated reactions, while a styrene-butadiene latex prepared without starch and its mixtures with enzyme thinned starch at the same monomers/starch ratios show very poor salt stability.

EXAMPLE 8

In this example, a hydroxyethylated starch (Pencote) and enzyme thinned hydroxyethylated starch (enzyme thinned Pencote) were used as a sole binder in the pigmented coatings of lightweight papers according to a procedure described in Example 2. The coating properties were then compared with those using reacted starch dispersions at a variety of monomers/starch ratios. The results are shown in Table 12. Gloss and IGT of papers coated with the reacted starch dispersions are much better than Pencote and enzyme thinned Pencote coated papers.

Numerous modifications and variations of the above-described invention are expected to occur to those of skill in the art. Accordingly, only such limitations as appear in the appended claims should be placed thereon.

TABLE 1

| Reaction Parameters Used in Example 1 | | | | | |
|---|---|---|---|---|---|
| Reaction Codes | 1A | 1B | 1C | 1D | 1E |
| Monomers/starch ratio | 70/30 | 70/30 | 75/25 | 80/20 | 80/20 |
| Starch (g) | 250 | 255 | 200 | 160 | 165 |
| Potassium Persulfate (g) | 29.2 | 29.8 | 30 | 32 | 33 |
| Sodium Bicarbonate (g) | — | — | — | — | — |
| Sodium Dodecyl Benzene Sulfonate (g) | — | — | — | — | — |
| Styrene (g) | 379.2 | 384 | 390 | 416 | 374.9 |
| 1,3-Butadiene (g) | 204.2 | 205 | 210 | 224 | 202.6 |
| Acrylic Acid (g) | — | 6 | — | — | 82.5 |
| Calculated solids (%) | 50 | 50 | 50 | 50 | 50 |
| Resulting dispersion | Excellent | Poor | Good | Poor | Poor |

TABLE 2

| Properties of Reacted Starch Dispersions Produced in Example 1 | | | | | |
|---|---|---|---|---|---|
| Reaction Codes | 1A | 1B | 1C | 1D | 1E |
| Grafting efficiency (%) | 58.7 | — | 57.5 | — | — |
| Ratio of ext./unext. | 0.387 | — | 0.443 | — | — |
| Salt stability | Excellent | — | Excellent | — | — |
| Mechanical stability | Good | — | Good | — | — |
| Dispersion viscosity (cps) | 189.5 | — | 120 | — | — |
| Coating color visc. (cps) | 1262 | — | 1570 | — | — |
| Gloss (%) | 71.0 | — | 70.9 | — | — |
| IGT (ft/min.) | 78.7 | — | 86.6 | — | — |

TABLE 3

| Reaction Parameters Used in Example 3 | | |
|---|---|---|
| Reaction Codes | 3A | 3B |
| Monomers/starch ratio | 75/25 | 80/20 |
| Starch (g) | 200 | 160 |
| Potassium Persulfate (g) | 30 | 32 |
| Sodium Bicarbonate (g) | 18 | 19 |
| Sodium Dodecyl Benzene Sulfonate (g) | — | — |
| Styrene (g) | 390 | 416 |
| 1,3-Butadiene (g) | 210 | 224 |
| Acrylic Acid (g) | — | — |
| Calculated solids (%) | 50 | 50 |
| Resulting dispersion | Excellent | Poor |

TABLE 4

| Properties of Reacted Starch Dispersions Produced in Example 3 | | |
|---|---|---|
| Reaction Codes | 3A | 3B |
| Grafting efficiency (%) | 75.1 | — |
| Ratio of ext./unext. | 0.214 | — |
| Salt stability | Excellent | — |
| Mechanical stability | Good | — |
| Dispersion viscosity (cps) | 516 | — |
| Coating color visc. (cps) | 756 | — |
| Gloss (%) | 72 | — |
| IGT (ft/min.) | 84.6 | — |

TABLE 5

| Reaction Parameters Used in Example 4 | | |
|---|---|---|
| Reaction Codes | 4A | 4B |
| Monomers/starch ratio | 70/30 | 80/20 |
| Starch (g) | 249 | 160 |
| Potassium Persulfate (g) | 29 | 32 |
| Sodium Bicarbonate (g) | — | — |
| Sodium Dodecyl Benzene Sulfonate (g) | 17.4 | 19.2 |
| Styrene (g) | 377.6 | 416 |
| 1,3-Butadiene (g) | 203.4 | 224 |
| Acrylic Acid (g) | — | — |
| Calculated solids (%) | 50 | 50 |
| Resulting dispersion | Good | Good |

TABLE 6

| Properties of Reacted Starch Dispersions Produced in Example 4 | | |
|---|---|---|
| Reaction Codes | 4A | 4B |
| Grafting efficiency (%) | 40.7 | 33.6 |
| Ratio of ext./unext. | 0.647 | 0.996 |
| Salt stability | Excellent | Excellent |
| Mechanical stability | Good | Good |
| Dispersion viscosity (cps) | 4760 | 1700 |
| Coating color visc. (cps) | — | — |
| Gloss (%) | Flocked clay | Flocked clay |
| IGT (ft/min.) | — | — |

TABLE 7

| Reaction Parameters Used in Example 5 | | | | | | | |
|---|---|---|---|---|---|---|---|
| Reaction Codes | 5A | 5B | 5C | 5D | 5E | 5F | 5G |
| Monomers/starch ratio | 80/20 | 80/20 | 80/20 | 85/15 | 90/10 | 95/5 | 100/0 |
| Starch (g) | 155 | 160 | 160 | 111 | 75 | 37 | — |
| Potassium Persulfate (g) | 31 | 32 | 32 | 31.5 | 33.8 | 35 | 40 |
| Sodium Bicarbonate (g) | 18.6 | 19 | 19 | 15.7 | 20.3 | 21 | 20 |
| Sodium Dodecyl Benzene Sulfonate (g) | 18.6 | 19 | 19 | 18.9 | 20.3 | 21 | 24 |
| Styrene (g) | 403 | 364 | 413 | 409 | 439 | 457 | 520 |
| 1,3-Butadiene (g) | 217 | 196 | 221 | 220 | 236 | 246 | 280 |
| Acrylic Acid (g) | — | 80 | 6 | — | — | — | — |
| Calculated solids (%) | 50 | 50 | 50 | 47 | 47 | 47 | 50 |
| Resulting dispersion | Good | Poor | Poor | Poor | Poor | Poor | Poor |

TABLE 8

| Properties of Reacted Starch Dispersions Produced in Example 5 | | | | | | | |
|---|---|---|---|---|---|---|---|
| Reaction Codes | 5A | 5B | 5C | 5D | 5E | 5F | 5G |
| Grafting efficiency (%) | 58.6 | — | — | — | — | — | — |
| Ratio of ext./unext. | 0.437 | — | — | — | — | — | — |
| Salt stability | Excellent | — | — | — | — | — | — |
| Mechanical stability | Good | — | — | — | — | — | — |
| Dispersion viscosity (cps) | 145 | — | — | — | — | — | — |
| Coating color visc. (cps) | 1900 | — | — | — | — | — | — |
| Gloss (%) | 73.6 | — | — | — | — | — | — |
| IGT (ft/min.) | 82.7 | — | — | — | — | — | — |

TABLE 9

| Reaction Parameters Used in Example 6 | | | | | | | |
|---|---|---|---|---|---|---|---|
| Reaction Codes | 6A | 6B | 6C | 6D | 6E | 6F | 6G |
| Monomers/starch ratio | 85/15 | 90/10 | 95/5 | 90/10 | 95/5 | 100/0 | 100/0 |
| Starch (g) | 108 | 73 | 36 | 81 | 40 | 0 | 0 |
| Potassium persulfate (g) | 30.6 | 32.8 | 34.2 | 14.6 | 15.2 | 16 | 16 |
| Sodium bicarbonate (g) | 12.2 | 6.6 | 6.8 | 7.3 | 7.6 | 8 | 8 |
| Sodium dodecyl benzene | 18.4 | 6.6 | 6.8 | 14.6 | 15.2 | 16 | *16 |
| Styrene (g) | 398 | 427 | 445 | 474 | 494 | 520 | 520 |
| 1,3-butadiene (g) | 214 | 230 | 239 | 255 | 266 | 280 | 280 |
| Acrylic acid (g) | 0 | 0 | 0 | 0 | 0 | 0 | 0 |
| Calculated solids (%) | 45 | 45 | 45 | 50 | 50 | 50 | 50 |
| Resulting dispersions | Excellent | Good | Poor | Poor | Good | Excellent | Poor |

*Nonionic surfactant: Tween 80 was used.

TABLE 10

| Properties of Reacted Starch Dispersions Produced in Example 6 | | | | | | | |
|---|---|---|---|---|---|---|---|
| Reaction Codes | 6A | 6B | 6C | 6D | 6E | 6F | 6G |
| Grafting efficiency (%) | 42.7 | 9.2 | — | — | 87.3 | — | — |
| Ratio of ext./unext. | 0.815 | 3.329 | — | — | 0.130 | — | — |
| Salt stability | Excellent | Excellent | — | — | Excellent | Poor | — |

TABLE 10-continued

Properties of Reacted Starch Dispersions Produced in Example 6

| Reaction Codes | 6A | 6B | 6C | 6D | 6E | 6F | 6G |
|---|---|---|---|---|---|---|---|
| Mechanical stability | Excellent | Excellent | — | — | Excellent | Excellent | — |
| Dispersion viscosity (cps) | 270 | 305 | — | — | 235 | 20 | — |
| Coating color viscosity (cps) | 960 | 1260 | — | — | 465 | — | — |
| Gloss (%) | 72.8 | 71.5 | — | — | 62.5 | — | — |
| IGT (ft/min.) | 89.8 | 74.0 | — | — | 69.1 | — | — |

TABLE 11

Salt Stability of S/B Reacted Starch Dispersions and Physical Blends of S/B Latex with Starch

| Samples | Salt Stability |
|---|---|
| 1) Reacted starch dispersions with monomers/starch ratios of | |
| 37/63 (6:10) | Excellent |
| 70/30 (23:10) | Excellent |
| 95/5 (190:10) | Excellent |
| 2) Styrene-butadiene latex (Sample 6F) | Poor |
| 3) Blends of S/B latex (Sample 6F) with starch at monomers/starch ratios of | |
| 37/63 (6:10) | Poor |
| 70/30 (23:10) | Poor |
| 95/5 (190:10) | Poor |

TABLE 12

Coating Results of Coatings Described in Example 8

| Samples | Gloss (%) | IGT (ft/min.) |
|---|---|---|
| 1) Pencote ® | 57.1 | 89.8 |
| 2) Enzyme thinned Pencote ® | 63.9 | 51.4 |
| 3) Reacted starch dispersions with monomers/starch ratios of: | | |
| 37/63 (6:10) | 69.9 | 96.1 |
| 75/25 (30:10) | 70.9 | 86.6 |
| 85/15 (57:10) | 72.8 | 89.8 |
| 95/5 (190:10) | 73.1 | 69.1 |

We claim:

1. An aqueous, salt stable polymeric dispersion comprising at least 20% by weight of solids, said dispersion comprising the reaction product of a thinned, gelatinized starch and one or more vinyl monomers in the presence of a suitable initiator, said vinyl monomer(s) comprising at least 10% 1,3-butadiene by weight with a vinyl monomer to starch ratio of between about 2:10 and about 190:10.

2. The dispersion of claim 1 wherein the initiator is selected from the group consisting of peroxide and persulfate initiators.

3. The dispersion of claim 1 wherein the initiator comprises a solid persulfate initiator.

4. The dispersion of claim 1 wherein said vinyl monomers comprise a second vinyl monomer other than 1,3-butadiene in addition to said 1,3-butadiene.

5. The dispersion of claim 1 wherein said vinyl monomers comprise up to about 70% 1,3-butadiene by weight.

6. The dispersion of claim 4 wherein said second vinyl monomer is styrene.

7. The dispersion of claim 1 wherein said thinned starch is a hydroxyethyl starch ether.

8. The dispersion of claim 1 wherein said thinned starch is characterized by an intrinsic viscosity of less than 0.12 dl/g.

9. The aqueous, salt stable composition of claim 1 additionally comprising unreacted starch.

10. The aqueous, salt stable composition of claim 1 additionally comprising unreacted latex.

11. A method for the production of an aqueous, salt stable polymeric dispersion comprising at least 20% by weight of solids comprising the steps of:
   forming a reaction mixture comprising a thinned, gelatinized starch and one or more vinyl monomers, said vinyl monomers comprising at least 10% 1,3-butadiene by weight, said mixture comprising a weight ratio of between about 2:10 and 190:10 vinyl monomer to starch; and
   reacting said reaction mixture under elevated pressure, in the presence of a suitable initiator, and for a period of time sufficient to yield an aqueous, salt stable dispersion.

12. The method of claim 11 wherein the initiator is selected from the group consisting of peroxide and persulfate initiators.

13. The method of claim 11 wherein the initiator is a solid persulfate initiator.

14. A coating color composition comprising a pigment and a binder comprising the dispersion of claim 1.

15. The coating color composition of claim 14 additionally comprising unreacted starch.

16. The coating color composition of claim 14 additionally comprising unreacted latex.

17. A method for coating a substrate comprising the steps of applying to said substrate the coating color composition of claim 14 to form a coating and drying said coating.

18. The method of claim 17 wherein said substrate is paper.

19. A method of preparing a coating color comprising a binder and a pigment wherein the binder is the aqueous, salt stable dispersion of claim 1 which is blended to the pigment during the make-down step.

* * * * *